(12) United States Patent
Sakabe et al.

(10) Patent No.: US 11,383,215 B2
(45) Date of Patent: Jul. 12, 2022

(54) CONTINUOUS PRODUCTION METHOD FOR AROMATIC POLYMER AND CONTINUOUS PRODUCTION APPARATUS FOR AROMATIC POLYMER

(71) Applicant: Kureha Corporation, Tokyo (JP)

(72) Inventors: Hiroshi Sakabe, Tokyo (JP); Michihisa Miyahara, Tokyo (JP); Kenji Suzuki, Tokyo (JP); Tasutaka Suzuki, Tokyo (JP)

(73) Assignee: KUREHA CORPORATION, Tokyo (JP)

( * ) Notice: Subject to any disclaimer, the term of this patent is extended or adjusted under 35 U.S.C. 154(b) by 0 days.

(21) Appl. No.: 16/314,505

(22) PCT Filed: Oct. 11, 2018

(86) PCT No.: PCT/JP2018/037914
§ 371 (c)(1),
(2) Date: Dec. 31, 2018

(87) PCT Pub. No.: WO2019/074053
PCT Pub. Date: Apr. 18, 2019

(65) Prior Publication Data
US 2020/0391168 A1    Dec. 17, 2020

(30) Foreign Application Priority Data
Oct. 12, 2017    (JP) .............................. JP2017-198709

(51) Int. Cl.
*B01J 19/00* (2006.01)
*C08G 65/26* (2006.01)

(52) U.S. Cl.
CPC ....... *B01J 19/0046* (2013.01); *B01J 19/0053* (2013.01); *C08G 65/2696* (2013.01);
(Continued)

(58) Field of Classification Search
CPC ........ C08G 65/38; C08G 73/10; C08G 85/00; B01J 2219/00306
See application file for complete search history.

(56) References Cited

U.S. PATENT DOCUMENTS 2,750,354 A * 6/1956 Merriam ................ B01J 19/245
526/65
4,108,837 A    8/1978 Johnson et al.
(Continued)

FOREIGN PATENT DOCUMENTS

CN    1272857 A    11/2000
CN    101223210 A    7/2008
(Continued)

OTHER PUBLICATIONS

Portno (J. Inst. Brew. vol. 75, 1969, 468-471) (Year: 1969).*
(Continued)

*Primary Examiner* — Liam J Heincer
(74) *Attorney, Agent, or Firm* — Abel Schillinger, LLP (57) ABSTRACT

To provide a continuous production apparatus and a continuous production method for an aromatic polymer which enable resource conservation, energy conservation, and equipment costs reduction. A continuous production method for an aromatic polymer having an ether bond or an imide bond, the method including: (a) supplying a polymerization solvent and a reaction raw material to a continuous production apparatus including a plurality of reaction vessels; (b) performing a polycondensation reaction in the polymerization solvent in at least one of the reaction vessels to form a reaction mixture; and (c) successively moving the reaction mixture to each of the reaction vessel, the steps (a), (b), and (c) being performed in parallel; wherein an ether bond or an imide bond is formed by the polycondensation reaction; respective gas phase parts of the plurality of reaction vessels
(Continued)

communicate with one another; and a pressure of each of the gas phase parts is uniform.

10 Claims, 3 Drawing Sheets

(52) U.S. Cl.
CPC .............. B01J 2219/0004 (2013.01); B01J 2219/00033 (2013.01); B01J 2219/0059 (2013.01); B01J 2219/00162 (2013.01); B01J 2219/00306 (2013.01); B01J 2219/00331 (2013.01); B01J 2219/00594 (2013.01); B01J 2219/00736 (2013.01); C08G 2650/40 (2013.01)

(56) References Cited

U.S. PATENT DOCUMENTS

| | | | |
|---|---|---|---|
| 4,175,175 A | 11/1979 | Johnson et al. | |
| 4,477,649 A | 10/1984 | Mobley | |
| 4,483,993 A * | 11/1984 | Marinak | B01J 19/245 546/345 |
| 4,503,214 A * | 3/1985 | White | C08G 65/44 526/65 |
| 4,578,449 A | 3/1986 | Mobley | |
| 5,245,057 A * | 9/1993 | Shirtum | B01J 19/1862 422/135 |
| 5,792,883 A * | 8/1998 | Harada | C07C 68/00 558/274 |
| 6,300,467 B1 | 10/2001 | Auer et al. | |
| 9,102,798 B2 | 8/2015 | Weber et al. | |
| 10,538,629 B2 * | 1/2020 | Miyahara | C08G 75/0259 |
| 2008/0214778 A1 | 9/2008 | Herwig et al. | |
| 2010/0261870 A1 | 10/2010 | Loeffler et al. | |
| 2015/0065677 A1 * | 3/2015 | El-Toufaili | C08G 65/40 528/174 |
| 2020/0230564 A1 * | 7/2020 | Sakabe | B01J 19/006 |
| 2020/0230567 A1 * | 7/2020 | Suzuki | C08G 65/4031 |
| 2020/0391172 A1 * | 12/2020 | Suzuki | B01J 19/1881 |
| 2020/0392291 A1 * | 12/2020 | Suzuki | C08G 75/025 |

FOREIGN PATENT DOCUMENTS

| | | | |
|---|---|---|---|
| GB | 1078234 | A | 8/1967 |
| GB | 1463298 | A | 2/1977 |
| JP | S5720966 | B2 | 5/1982 |
| JP | S59-230026 | A | 12/1984 |
| JP | H7138360 | A | 5/1995 |
| JP | 08-071395 | A | 3/1996 |
| JP | 8-188558 | A | 7/1996 |
| JP | 10-158222 | A | 6/1998 |
| JP | 2002-505712 | A | 2/2002 |
| JP | 2008-285596 | A | 11/2008 |
| JP | 2009-501819 | A | 1/2009 |
| JP | 2011-506727 | A | 3/2011 |
| JP | 2013502476 | A | 1/2013 |
| WO | 2017/179327 | A1 | 10/2017 |
| WO | 2018/159220 | A1 | 9/2018 |
| WO | 2018/159221 | A1 | 9/2018 |
| WO | 2018/159222 | A1 | 9/2018 |
| WO | 2018/159223 | A1 | 9/2018 |

OTHER PUBLICATIONS

International Search Report for PCT/JP2018/037914 dated Jan. 8, 2019, 10 pgs.
Office Action from IN Application No. 201817048429, dated Jun. 9, 2020, 5 pgs.
European Search Report for EP App No. 18826168.9 dated Aug. 1, 2019, 6 pgs.
English Translation of International Preliminary Report on Patentability from PCT Application No. PCT/JP2018/037914, dated Apr. 23, 2020, 8 pgs.
Office Action from EP Application No. 18826168.9, dated May 6, 2020, 4 pgs.
Office Action from JP Application No. 2018-558369, dated Oct. 23, 2019, 6 pgs.
Office Action from CN Application No. 201880002556.0, dated Dec. 30, 2020, 12 pgs.
Office Action from KR Application No. 10-2018-7037224, dated Feb. 28, 2020, 26 pgs.

* cited by examiner

CONTINUOUS PRODUCTION METHOD FOR AROMATIC POLYMER AND CONTINUOUS PRODUCTION APPARATUS FOR AROMATIC POLYMER

TECHNICAL FIELD

The present invention relates to a continuous production method for an aromatic polymer and a continuous production apparatus for an aromatic polymer.

BACKGROUND ART

Aromatic polymers such as polyphenylsulfone (PPSU), polysulfone (PSU), polyethersulfone (PES), polyetheretherketone (PEEK), polyethernitrile (PEN), and polyetherimide (PEI) exhibit excellent heat resistance, chemical resistance, flame retardancy, mechanical strength, electrical characteristics, dimensional stability, and the like. Because these aromatic polymers can be molded into various molded products, films, sheets, fibers, and the like by general melt processes such as extrusion molding, injection molding, and compression molding, they are used in a wide range of technical fields such as electric devices, electronic devices, automobile instruments, and packaging materials.

Patent Document 1 discloses a production method for polyphenylsulfone (PPSU). Patent Document 2 discloses polysulfone (PSU) and polyethersulfone (PES). Patent Document 3 discloses a production method for polyetheretherketone (PEEK) and polyethernitrile (PEN) in N-methyl-2-pyrrolidone (NMP). Patent Document 4 discloses a production method for polyetherimide (PEI).

CITATION LIST

Patent Literature

Patent Document 1: JP 2013-502476 T
Patent Document 2: GB 1078234 B
Patent Document 3: JP H07-138360 A
Patent Document 4: JP S57-20966 B

SUMMARY OF INVENTION

Technical Problem

In a known continuous production apparatus for an aromatic polymer, a plurality of pressure-resistant polymerization vessels, piping between the polymerization vessels, transfer equipment, instrumentation, and the like are necessary, and because it takes a large amount of energy to drive the apparatus, it is difficult to achieve resource conservation, energy conservation, equipment costs reduction, or the like.

The present invention was conceived in light of the problem described above, and an object of the present invention is to provide a continuous production apparatus and a continuous production apparatus for an aromatic polymer which enable resource conservation, energy conservation, and equipment costs reduction.

Solution to Problem

To solve the problem described above, the continuous production method for an aromatic polymer according to an embodiment of the present invention is a continuous production method for an aromatic polymer having an ether bond or an imide bond, the method including:

(a) supplying a polymerization solvent and a reaction raw material to a continuous production apparatus including a plurality of reaction vessels;
(b) performing a polycondensation reaction in the polymerization solvent in at least one of the reaction vessels to form a reaction mixture; and
(c) successively moving the reaction mixture to each of the reaction vessels;
the steps (a), (b), and (c) being performed in parallel;
wherein an ether bond or an imide bond is formed by the polycondensation reaction;
respective gas phase parts of the plurality of reaction vessels communicate with one another; and
a pressure of each of the gas phase parts is uniform.

In addition, the continuous production apparatus for an aromatic polymer according to an embodiment of the present invention is a continuous production apparatus for an aromatic polymer in which an ether bond or an imide bond is formed by a polycondensation reaction, the apparatus including a plurality of reaction vessels; wherein a reaction mixture is formed by performing a polycondensation reaction in a polymerization solvent in at least one of the reaction vessels; gas phase parts of the reaction vessels communicate with one another; and the reaction vessels are sequentially connected such that the reaction mixture successively moves to each of the reaction vessels.

Advantageous Effects of Invention

According to the present invention, it is possible to provide a continuous production apparatus and a continuous production method for an aromatic polymer which enable resource conservation, energy conservation, and equipment costs reduction.

DESCRIPTION OF EMBODIMENTS

Embodiments of the present invention will be described in detail hereinafter, but the present invention is not limited to these embodiments.

Embodiment 1

Continuous Production Apparatus

The configuration of a continuous production apparatus that can be used in a production method for an aromatic polymer having an ether bond or an imide bond according to an embodiment of the present invention (called "Embodiment 1" hereinafter) will be described with reference to FIG. 1.

Figure 1:
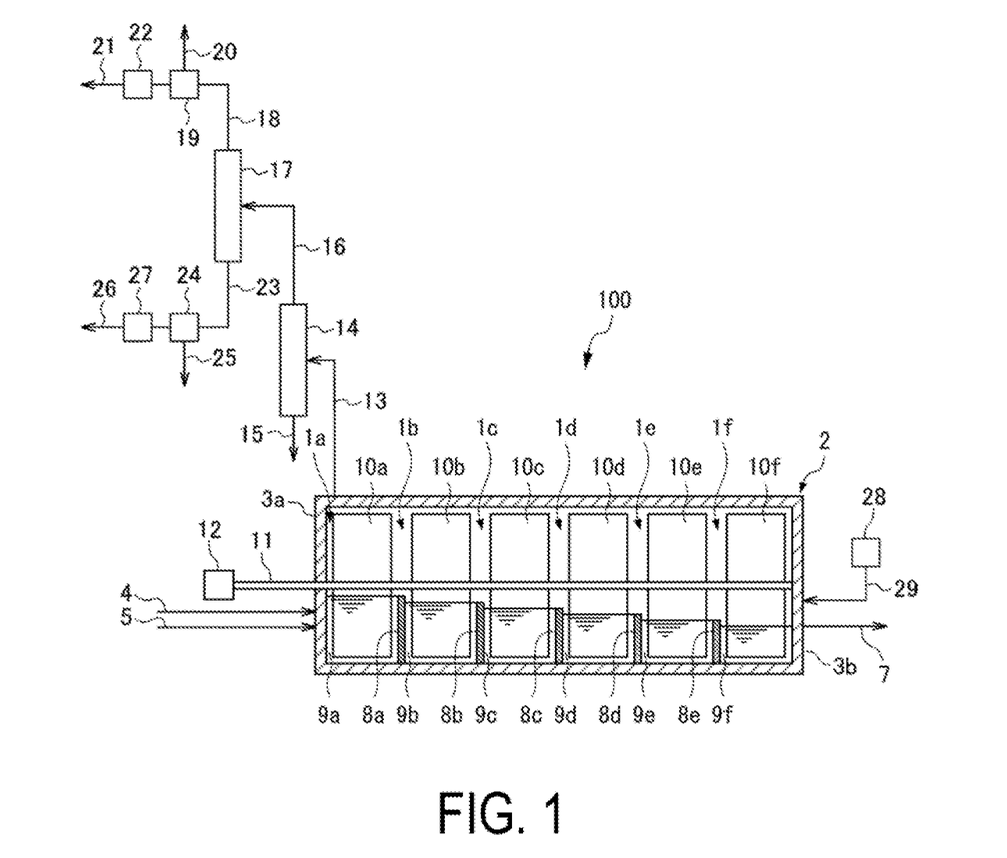
FIG. 1 is a partial cross-sectional view of the continuous production apparatus according to an embodiment of the present invention.

FIG. 1 is a partial cross-sectional view illustrating the configuration of a continuous production apparatus that can be used in the production method for an aromatic polymer according to Embodiment 1.

Referring to FIG. 1, a continuous production apparatus 100 includes a housing chamber 2 configured to house reaction vessels 1a, 1b, 1c, 1d, 1e, and 1f. The housing chamber 2 is a cylindrical vessel which extends from the reaction raw material supply side toward the reaction mixture recovery side. The housing chamber 2 is installed so that the liquid surfaces of the reaction vessels 1a, 1b, 1c, 1d, 1e, and 1f are horizontal. The shape of the housing chamber 2 is not particularly limited, and may be a hollow cylindrical shape or hollow prismatic shape having a side wall 3a in contact with the reaction vessel 1a and a side wall 3b in contact with the reaction vessel 1f, for example, as bottom surfaces.

A reaction solvent supply line 4 configured to supply a reaction solvent to the housing chamber 2 and a reaction raw material supply line 5 configured to supply reaction raw materials to the housing chamber 2 are connected to the side wall 3a of the housing chamber 2. The number of reaction raw material supply lines 5 connected to the housing chamber 2 is not particularly limited, and the configuration may be such that only one line is connected or a plurality of lines are connected to the housing chamber 2. Note that the reaction raw material supply line 5 is configured to supply one type of reaction raw material for each supply line, and in a case where a plurality of reaction raw materials are supplied to the housing chamber 2, a plurality of reaction raw material supply lines 5 are connected to the housing chamber 2. A water supply line configured to supply water to the housing chamber 2 may also be connected as necessary. A reaction mixture recovery line 7 configured to recover the reaction mixture from the housing chamber 2 is connected to the side wall 3b of the housing chamber 2. The reaction solvent and the reaction raw materials may be supplied to the liquid phase of the reaction vessel 1a via a gas phase or may be supplied directly to the liquid phase of the reaction vessel 1a.

The reaction vessels 1a and 1b are separated by a partition wall 8a. The reaction vessels 1b and 1c are separated by a partition wall 8b. The reaction vessels 1c and 1d are separated by a partition wall 8c. The reaction vessels 1d and 1e are separated by a partition wall 8d. The reaction vessels 1e and 1f are separated by a partition wall 8e. The reaction vessels 1a, 1b, 1c, 1d, 1e, and 1f communicate with one another via a gas phase in the housing chamber 2. As a result, the pressure of the gas phase in the housing chamber 2 is uniform.

The dimensions of the partition walls 8a, 8b, 8c, 8d, and 8e differ from one another, and the height is greatest in the order of the partition walls 8a, 8b, 8c, 8d, and 8e. Therefore, the maximum liquid surface level of a liquid that can be housed therein is highest in the order of the reaction vessels 1a, 1b, 1c, 1d, 1e, and 1f. The reaction vessels 1a, 1b, 1c, 1d, 1e, and 1f are connected in series in the order described above. As a result, a countercurrent from the reaction vessel 1b to the reaction vessel 1a, a countercurrent from the reaction vessel 1c to the reaction vessel 1b, a countercurrent from the reaction vessel 1d to the reaction vessel 1c, a countercurrent from the reaction vessel 1e to the reaction vessel 1d, and a countercurrent from the reaction vessel 1f to the reaction vessel 1e are prevented. The reaction vessels 1a, 1b, 1c, 1d, 1e, and 1f can respectively house reaction mixtures 9a, 9b, 9c, 9d, 9e, and 9f. For example, the raw material mixture in the reaction vessel 1a flows over the partition wall 8a and moves into the reaction vessel 1b.

In this way, in a preferred embodiment of the continuous production apparatus according to an embodiment of the present invention, the reaction vessels are configured so that at least one pair among the combinations of adjacent reaction vessels is connected in the order of the highest maximum liquid surface level of a liquid that can be housed by the reaction vessels, and the reaction mixture moves from a reaction vessel with a higher maximum liquid surface level to a reaction vessel with a lower maximum liquid surface level.

With this configuration, the reaction mixture moves in accordance with gravity and the difference in the liquid surface level, and therefore it is unnecessary to provide a separate means for moving the reaction mixture to the next reaction vessel. Note that in a case where the base areas of the reaction vessels 1a to 1f are the same, the amount of the reaction mixture that can be housed decreases in the order of the reaction vessels 1a, 1b, 1c, 1d, 1e, and 1f.

In the housing chamber 2, a stirring blade 10a configured to stir the reaction mixture 9a in the reaction vessel 1a, a stirring blade 10b configured to stir the reaction mixture 9b in the reaction vessel 1b, a stirring blade 10c configured to stir the reaction mixture 9c in the reaction vessel 1c, a stirring blade 10d configured to stir the reaction mixture 9d in the reaction vessel 1d, a stirring blade 10e configured to stir the reaction mixture 9e in the reaction vessel 1e, and a stirring blade 10f configured to stir the reaction mixture 9f in the reaction vessel 1f are installed on the same stirring shaft 11. The stirring shaft 11 is installed so as to pass through the side wall 3a from the outside of the housing chamber 2 and to reach the side wall 3b. A rotary driving device 12 configured to rotate the stirring shaft 11 is installed at the end of the stirring shaft 11 on the side wall 3a side.

In the production of an aromatic polymer performed using the continuous production apparatus 100, in a case where the polycondensation reaction is a desalting polycondensation reaction, as described below, a salt is precipitated as the reaction progresses. The precipitated salt tends to accumulate over the entire bottom surfaces of the reaction vessels 1a to 1f, and thus it is particularly preferable to stir sufficiently by the stirring blades 10a to 10f. To ensure that stirring is performed sufficiently by the stirring blades 10a to 10f without accumulation of the precipitated salt, the width of the stirring blades 10a to 10f is preferably large, for example, not less than 50%, preferably not less than 60%, more preferably not less than 70%, and even more preferably not less than 80% of the width of the reaction vessels 1a to 1f. Here, the width of the stirring blades refers to the length of each stirring blade in the direction in which the reaction solution moves, that is, the direction from reaction vessel 1a to 1f. In addition, the stirring blades are positioned so that the precipitated salt does not accumulate and stop flowing. Some or all of the stirring blades 10a to 10f may be positioned in the center of each reaction vessel so that a large bias does not occur during stirring.

One end of a discharge line 13 is connected near the side wall 3a of the housing chamber 2. A water removing unit 14 configured to remove water from the gas phase in the housing chamber 2 is connected to the other end of the discharge line 13. The water removing unit 14 communicates with the gas phase in the housing chamber 2 through the discharge line 13. A reaction solvent recovery line 15 is connected to one end of the water removing unit 14 (for example, the lower part). One end of a vapor recovery line 16 is connected to the other end of the water removing unit 14 (for example, the upper part). A gas-liquid separation unit 17 is connected to the other end of the vapor recovery line 16. A reaction raw material separation and recovery unit 19 is connected to the other end of a gas recovery line 18 branching from one end of the gas-liquid separation unit 17

(for example, the upper part). A waste gas line 20 and a reaction raw material resupply line 21 branch from the raw material separation and recovery part 19, and a reaction raw material resupply unit 22 configured to resupply at least a portion of the reaction raw materials separated and recovered by the reaction raw material separation and recovery unit 19 to at least one of the reaction vessels 1a to 1f is connected to the reaction raw material resupply line 21. On the other hand, a reaction raw material separation and recovery unit 24 is connected to the other end of a liquid recovery line 23 branching from the other end of the gas-liquid separation unit 17 (for example, the lower part). A wastewater line 25 and a reaction raw material resupply line 26 branch from the reaction raw material separation and recovery unit 24, and a reaction raw material resupply unit 27 configured to resupply at least a portion of the reaction raw materials separated and recovered by the reaction raw material separation and recovery unit 24 to at least one of the reaction vessels 1a to 1f is connected to the reaction raw material resupply line 26. At least a portion of the reaction raw materials may be supplied to the liquid phase of at least one of the reaction vessels 1a to 1f via the gas phase, or may be supplied directly to the liquid phase of at least one of the reaction vessels 1a to 1f. Note that depending on the situation, at least one of the gas-liquid separation unit 17, the gas recovery line 18, the raw material separation and recovery part 19, the waste gas line 20, the reaction raw material resupply line 21, the reaction raw material resupply unit 22, the liquid recovery line 23, the reaction raw material separation and recovery unit 24, the wastewater line 25, the reaction raw material resupply line 26, or the reaction raw material resupply unit 27 may be omitted.

A gas feeding unit 28 which communicates with the gas phase in the housing chamber 2 and feeds an inert gas to the gas phase from the downstream side toward the upstream side in the movement direction of the reaction mixture, that is, from the reaction vessel 1f toward the reaction vessel 1a, is connected to the side wall 3b of the housing chamber 2 via gas feeding line 29. The inert gas is not particularly limited, and examples thereof include noble gases such as argon, nitrogen and the like.

Next, the operation of Embodiment 1 will be described with reference to FIG. 1.

A reaction solvent and reaction raw materials are respectively supplied to the housing chamber 2 through the reaction solvent supply line 4 and the reaction raw material supply line 5. Note that some or all of the raw materials may be supplied to the housing chamber 2 after they are mixed in advance. For example, a mixture of the reaction solvent and the reaction raw materials may be prepared in advance, and this mixture may be supplied to the housing chamber 2. In this case, a mixture supply line 4a (not illustrated) may be connected to the side wall 3a instead of the reaction solvent supply line 4 and the reaction raw material supply line 5, and the mixture may be supplied to the housing chamber 2 through the mixture supply line 4a. In a case where this mixture contains water, it may be used after at least a portion of the water is removed.

The reaction solvent and reaction raw materials that are supplied are mixed in the reaction vessel 1a, and the reaction raw materials are subjected to a polycondensation reaction in the reaction solvent and thereby a reaction mixture 9a is formed. Note that depending on the situation, the configuration may be such that the polymerization reaction does not substantially proceed in the reaction vessel 1a and then proceed from the reaction vessel 1b and onward. Here, the aromatic polymer to be produced by the continuous production apparatus 100 is an aromatic polymer in which an ether bond or an imide bond is formed by a polycondensation reaction. Note that this aromatic polymer may also contain an ether bond or an imide bond originating from a reaction raw material in addition to an ether bond or an imide bond formed by a polycondensation reaction.

When the height of the reaction mixture 9a exceeds the maximum liquid surface level of the reaction vessel 1a, the reaction mixture 9a flows over the partition wall 8a and into the reaction vessel 1b. In the reaction vessel 1b, as in the case of the reaction vessel 1a, the reaction raw materials are subjected to a polycondensation reaction in the reaction solvent, and thereby a reaction mixture 9b is formed. Further, when the height of the reaction mixture 9b exceeds the maximum liquid surface level of the reaction vessel 1b, the reaction mixture 9b flows over the partition wall 8b and into the reaction vessel 1c. In the reaction vessel 1c, as in the case of the reaction vessels 1a and 1b, the reaction raw materials are subjected to a polycondensation reaction in the reaction solvent, and thereby a reaction mixture 9c is formed. Further, when the height of the reaction mixture 9c exceeds the maximum liquid surface level of the reaction vessel 1c, the reaction mixture 9c flows over the partition wall 8c and into the reaction vessel 1d. In the reaction vessel 1d, as in the case of the reaction vessels 1a, 1b, and 1c, the reaction raw materials are subjected to a polycondensation reaction in the reaction solvent, and thereby a reaction mixture 9d is formed. Further, when the height of the reaction mixture 9d exceeds the maximum liquid surface level of the reaction vessel 1d, the reaction mixture 9d flows over the partition wall 8d and into the reaction vessel 1e. In the reaction vessel 1e, as in the case of the reaction vessels 1a, 1b, 1c, and 1d, the reaction raw materials are subjected to a polycondensation reaction in the reaction solvent, and thereby a reaction mixture 9e is formed. Further, when the height of the reaction mixture 9e exceeds the maximum liquid surface level of the reaction vessel 1e, the reaction mixture 9e flows over the partition wall 8e and into the reaction vessel 1f. In the reaction vessel 1f, as in the case of the reaction vessels 1a, 1b, 1c, 1d, and 1e, the reaction raw materials are subjected to a polycondensation reaction in the reaction solvent, and thereby a reaction mixture 9f is formed. Finally, when the height of the reaction mixture 9f exceeds the maximum liquid surface level of the reaction vessel 1f, the reaction mixture 9f is recovered through the reaction mixture recovery line 7. An aromatic polymer can be obtained by performing a purification operation and/or additional polycondensation reaction or the like as necessary on the recovered reaction mixture 9f. Note that the maximum liquid surface level of the reaction vessel 1f is determined by, for example, the connection position of the reaction mixture recovery line 7 on the side wall 3b. In this way, the reaction mixture successively moves from reaction vessels with a higher maximum liquid surface level to reaction vessels with a lower maximum liquid surface level in the order of the reaction vessels 1a, 1b, 1c, 1d, 1e, and 1f due to the difference in the maximum liquid surface level in the reaction vessels 1a to 1f. When successively moving the reaction mixture using the difference in maximum liquid surface level, the reaction mixture is moved using gravity, and therefore a large amount of energy is not required. This facilitates resource conservation, energy conservation, equipment costs reduction, and the like. Note that when the reaction mixtures 9a, 9b, 9c, 9d, and 9e exceed the maximum liquid surface levels, the reaction mixtures can flow over the respective partition walls 8a, 8b, 8c, 8d, and 8e, and as long as the communication between the respective reaction vessels 1a, 1b, 1c, 1d, 1e, and 1f via the gas phase in the housing chamber 2 is not inhibited, the shape of the partition walls 8a, 8b, 8c, 8d, and 8e is not particularly limited and may be any shape. In addition, the reaction solution may also move due to an opening part in the partition wall, such as a through-hole or a slit (neither illustrated), for example.

At least a part of the water inside the housing chamber 2 is removed from the housing chamber 2 via the gas phase in the housing chamber 2 due to the action of the water removing unit 14 (details given below) through the discharge line 13. The water inside the housing chamber 2 may be water that is supplied to the housing chamber 2, water produced by the polycondensation reaction, or the like. Here, the water that is supplied to the housing chamber 2 refers to water that is intentionally supplied to the housing chamber 2 and, when water is not intentionally supplied to the housing chamber 2, water that is ordinarily supplied to the housing chamber 2 together with the reaction raw materials while contained in the raw materials. Due to the high vapor pressure of water, in a case where the water content of the gas phase of the housing chamber 2 is high, the pressure inside the housing chamber 2 tends to be high. In such a case, the housing chamber 2 needs to be made pressure-resistant, which makes it difficult to achieve resource conservation, equipment costs reduction, and the like. The method of removing water with the water removing unit 14 may be water removal by heating, water removal by depressurization, or the like. Removal of water in the water removing unit 14 and reduction in the pressure inside the housing chamber 2 can achieve resource conservation, equipment costs reduction, and the like effectively.

The pressure inside the housing chamber 2 is not particularly limited as long as the pressure is within a range that can be reduced to a pressure at which the solvent that is supplied does not boil. Although a negative gauge pressure may also be used, the pressure may be reduced to a gauge pressure of 0 MPaG from the perspective of reducing the energy cost and the boiling point of the solvent. For example, the pressure is preferably not lower than 0.0001 MPaG and not greater than 0.8 MPaG, more preferably not lower than 0.01 MPaG and not greater than 0.65 MPaG, even more preferably not lower than 0.02 MPaG and not greater than 0.39 MPaG, and particularly preferably not lower than 0.03 MPaG and not greater than 0.37 MPaG.

The housing chamber 2 may include a temperature control device such as a heating means for separately controlling the temperatures of the reaction vessels 1a to 1f (not illustrated). Providing a temperature control device achieves the effect of allowing stable polymerization to be performed.

The reaction vessels 1a to 1f communicate with one another via the gas phase in the housing chamber 2, and the pressure of the gas phase in the housing chamber 2 is uniform. Therefore, water can be removed evenly from each of the reaction vessels 1a to 1f by the water removing unit 14, and the amount of water in the reaction mixture decreases from the reaction vessel 1a toward the reaction vessel 1f, that is, from the upstream side toward the downstream side in the movement direction of the reaction mixture. As a result, the inhibition of the reaction by water is suppressed, and the polycondensation reaction is accelerated. In addition, due to an increase in the boiling point of the reaction mixture, polymerization may be carried out at a high temperature, which further accelerates the polycondensation reaction. The acceleration in the polymerization reaction facilitates an increase in the temperature of the reaction mixture, which further accelerates the polycondensation reaction. As described above, in the continuous polymer production apparatus 100, means may be provided so that each part is disposed as described above, for example, and the temperatures of the reaction vessels 1a to 1f may be increased from the upstream side toward the downstream side in the movement direction over the entire course of performing continuous reactions.

An inert gas is fed to the gas phase in the housing chamber 2 by the gas feeding unit 28 from the downstream side toward the upstream side in the movement direction of the reaction mixture, that is, from the reaction vessel 1f toward the reaction vessel 1a. As described above, in order to maintain a state in which the amount of water in the reaction mixture decreases from the upstream side toward the downstream side in the movement direction of the reaction mixture, it is preferable to use a configuration in which the moisture evaporated from the reaction mixture does not flow to the downstream side and condense on the reaction mixture. By feeding the inert gas to the gas phase with the gas feeding unit 28 as described above, it is possible to effectively prevent water vapor from flowing to the downstream side and condensing on the reaction mixture.

The flow rate of the inert gas is not particularly limited as long as the flow rate is within a range in which the flow of water vapor toward the downstream side is inhibited. For example, in a case where the housing chamber 2 has a hollow cylindrical shape with an inner radius r using the side walls 3a and 3b as bottom faces, the equation $u=F/(\pi r^2)$ holds, where u is the flow rate of the inert gas and F is the volumetric flow rate of the inert gas. Here, taking into consideration the fact that Taylor dispersion is established, that is, the system changes from molecular diffusion control to convective dispersion control, in a case where the flow of water vapor to the downstream side is inhibited, the relation $r \cdot u \gg D$ (where D is the diffusion coefficient of water vapor) is established as a condition under which Taylor dispersion is established. Thus, the flow rate of the inert gas is, for example, in a range in which $F \gg D \cdot \pi r$, more specifically, $F>10D \cdot \pi r$, preferably $F>25D \cdot \pi r$, and more preferably $F>50D \cdot \pi r$ holds. Note that in a case where the housing chamber 2 has a hollow columnar shape having the side walls 3a and 3b as bottom faces and having a cross section with any shape in a direction perpendicular to the movement direction of the reaction mixture, the above equation can be applied using r as a representative length in the direction perpendicular to the movement direction of the reaction mixture, that is, the equivalent circular radius of the cross section of a given shape.

The stirring shaft 11 is rotated by a rotary driving device 12, and the stirring blades 10a to 10f installed on the stirring shaft 11 rotate around the stirring shaft 11 accordingly. Thus, the reaction mixtures 9a to 9f are stirred. The stirring blades 10a to 10f are installed on the same stirring shaft 11, and therefore all of the stirring blades 10a to 10f can be rotated under the same conditions by simply rotating the stirring shaft 11 with the rotary driving device 12. This makes it possible to achieve uniform stirring with high efficiency. In a case where the polycondensation reaction is desalting polycondensation, a salt is precipitated as the polycondensation reaction progresses, and the salt accumulates in the reaction vessels 1a to 1f. As a result, the effective volume for proceeding a sufficient polycondensation reaction in the reaction vessels 1a to 1f decreases, which causes a reduction in productivity or the like. Therefore, an additional maintenance operation for removing the accumulated salt may be required. Stirring the reaction mixtures 9a to 9f with the stirring blades 10a to 10f facilitates the dispersion of the salt in the reaction mixtures 9a to 9f, the movement of the salt into the reaction vessels on the downstream side, and the discharge of the salt to the outside of the housing chamber 2. On the other hand, excessive stirring may cause the reaction mixture to flow over the partition wall 8a, 8b, 8c, 8d, or 8e and unnecessary mixing of the reaction mixture from the reaction vessel on the upstream side into the reaction vessel on the downstream side. The shape, number, rotational speed, and the like of the stirring blades are preferably adjusted appropriately to promote the dispersion of the salt such that the unnecessary mixing of reaction mixtures between reaction vessels can be avoided. Of these, the rotational speed of the stirring blades may be chosen to satisfy the condition that the salt is not sedimented, specifically, the stirring speed of the stirring blade is not lower than the minimum agitation speed for suspension of particles. Note that from the perspective of easily preventing the reaction mixture from flowing over the partition walls 8a, 8b, 8c, 8d, and 8e, the upper limit of the rotational speed at the tip of the stirring blade is preferably a speed at which the rotational speed of the stirring blade is not greater than 120 rpm, and is more preferably a speed at which the rotational speed of the stirring blade is not greater than 60 rpm. In addition, the rotation path or the like of the stirring blades is also preferably adjusted appropriately so that stirring is performed sufficiently. For example, a stirring blade preferably passes through at least a portion deeper than ½ the average value of the depth of the liquid in the reaction vessel stirred by that stirring blade. In particular, to ensure that stirring is performed sufficiently near the deepest part of each of the reaction vessels 1a to 1f and that a salt does not accumulate, it is preferable to reduce the size of the gap between the stirring blade 10a and the base of the reaction vessel 1a, the gap between the stirring blade 10a and the partition wall 8a, the gap between the stirring blade 10b and the base of the reaction vessel 1b, the gap between the stirring blade 10b and the partition wall 8b, the gap between the stirring blade 10c and the base of the reaction vessel 1c, the gap between the stirring blade 10c and the partition wall 8c, the gap between the stirring blade 10d and the base of the reaction vessel 1d, the gap between the stirring blade 10d and the partition wall 8d, the gap between the stirring blade 10e and the base of the reaction vessel 1e, the gap between the stirring blade 10e and the partition wall 8e, the gap between the stirring blade 10f and the base of the reaction vessel 1f, and the gap between the stirring blade 10f and the side wall 3b.

Exhaust from the housing chamber 2 is supplied to the water removing unit 14 via the discharge line 13. The water removing unit 14 functions as a distillation column, for example, wherein a liquid containing the reaction solvent as a primary component is recovered from one end (for example, the lower part), and vapor containing raw materials and water is recovered from the other end (for example, the upper part).

The reaction solvent recovered from the water removing unit 14 may be resupplied to the housing chamber 2 as a raw material for a polycondensation reaction after purification or the like as necessary. At this time, the supply to the housing chamber 2 may be accomplished through the reaction solvent supply line 4 or through a reaction solvent supply line other than the reaction solvent supply line 4. The supply destination may be any one of the reaction vessels 1a to 1f or may be a combination of two or more thereof.

The vapor recovered from the other end of the water removing unit 14 is supplied to the gas-liquid separation unit 17 via the vapor recovery line 16. The gas-liquid separation unit 17 functions as a distillation column, for example, wherein a gas is recovered from one end (for example, the upper part), and a liquid containing water is recovered from the other end (for example, the lower part).

The gas recovered from one end of the gas-liquid separation unit 17 is supplied to the reaction raw material separation and recovery unit 19 via the gas recovery line 18. In the reaction raw material separation and recovery unit 19, some of the reaction raw materials are separated and recovered and are fed to the reaction raw material resupply unit 22 via the reaction raw material resupply line 21. On the other hand, the remaining gas is discarded as waste gas via the waste gas line 20.

Some of the reaction raw materials separated and recovered as a gas by the reaction raw material separation and recovery unit 19 are resupplied to at least some of the reaction vessels 1a to 1f by the reaction raw material resupply unit 22. At this time, the resupply to the reaction vessel 1a may be accomplished through the reaction raw material supply line 5 or through a reaction raw material supply line other than the reaction raw material supply line 5. Resupplying at least some of the reaction raw materials achieves effective utilization of the reaction raw materials and resource conservation.

The liquid recovered from the gas-liquid separation unit 17 is supplied to the reaction raw material separation and recovery unit 24 via the liquid recovery line 23. In the reaction raw material separation and recovery unit 24, some of the reaction raw materials are separated and recovered from the recovered liquid and fed to the reaction raw material resupply unit 27 via the reaction raw material resupply line 26. On the other hand, the remaining liquid is discarded as wastewater via the wastewater line 25.

Some of the reaction raw materials separated and recovered by the reaction raw material separation and recovery unit 24 are resupplied to at least some of the reaction vessels 1a to 1f by the reaction raw material resupply unit 27. At this time, the resupply to the reaction vessel 1a may be carried out through the reaction raw material supply line 5 or through a reaction raw material supply line other than the reaction raw material supply line 5. Resupplying at least some of the reaction raw materials achieves effective utilization of the reaction raw materials and resource conservation.

Although a case in which the stirring shaft 11 of Embodiment 1 is a single shaft is illustrated, multiple shafts such as two or three or more shafts may be used.

In addition, only water removal is performed in the reaction vessel 1a described in Embodiment 1.

Further, "sequentially connected" in this specification means that all of the vessels are preferably connected in series, but some of the vessels may be connected in parallel.

As described above, the continuous production apparatus 100 does not require a plurality of polymerization vessels, and thus the piping between the plurality of polymerization vessels, transfer equipment, instrumentation, and the like are unnecessary. In addition, the movement or the like of the reaction mixture is achieved using gravity to drive the continuous production apparatus 100 based on the difference in maximum liquid surface level and therefore a large amount of energy is unnecessary. With such configurations, the continuous production apparatus 100 can easily achieve resource conservation, energy conservation, and equipment costs reduction.

Continuous Production Method

Next, a continuous production method performed using the continuous production apparatus 100 described above will be described.

The continuous production method according to the present embodiment is a continuous production method for an aromatic polymer having an ether bond or an imide bond and relates to the polymerization of an aromatic polymer in which an ether bond or an imide bond is formed by a polycondensation reaction. Note that the aromatic polymer may also contain an ether bond or an imide bond originating from a reaction raw material in addition to an ether bond or an imide bond formed by a polycondensation reaction.

From the perspective of achieving a substantially improved effect over technologies in the related art, the polycondensation reaction preferably involves the continuous polymerization method of the present embodiment for the production of a polymer formed by a desalting polycondensation reaction in which an ether bond is formed.

In addition, one or more pairs of combinations of adjacent reaction vessels are preferably sequentially connected in the order of the highest maximum liquid surface level of a liquid that can be housed by the reaction vessels. The reaction mixture is preferably moved from reaction vessels with a higher maximum liquid surface level to reaction vessels with a lower maximum liquid surface level due to the difference in maximum liquid surface level.

In addition to aromatic polymers containing aromatic rings and ether bonds, aromatic polymers in which an ether bond is formed by a polycondensation reaction also include polymers containing at least one group selected from groups including sulfone groups, ketone groups, and nitrogen in addition to these groups. Examples include aromatic polysulfones such as polysulfone (PSU), polyphenyl sulfone (PPSU), and polyether sulfone (PES), which have a sulfone group in addition to the groups described above. Additional examples include polyaryl ether ketones (PAEK) which has a ketone group in addition to an aromatic ring and an ether bond. Specific examples include polyether ether ketone (PEEK), polyether ketone (PEK), polyether ketone ketone (PEKK), polyether ether ketone ketone (PEEKK), and polyether ketone ether ketone ketone (PEKEKK).

Examples of aromatic polymers containing a nitrogen atom include aromatic polymers in which a group containing a nitrogen bond with an aromatic ring in addition to aromatic rings and ether bonds. Specific examples include polyether nitriles (PEN) having a nitrile groups.

In the above descriptions, a case in which a plurality of the above groups coexist in the polymer is classified as an aromatic polymer corresponding to the group with the highest molar content ratio.

From the perspective of ease of production with the method of the present invention, aromatic polyethers are preferable, and polyarylene sulfide, aromatic polysulfone, polyaryl ether ketone, and polyether nitrile are more preferable.

A polymerization reaction for obtaining the aromatic polymer having an ether bond is typically a desalting polycondensation reaction.

The aromatic polysulfone of the present invention can be produced by performing a polycondensation reaction on an aromatic dihalogenosulfone compound and an aromatic dihydroxy compound in the presence of a base and a polymerization solvent. In the present invention, an aromatic polysulfone is typically a resin having repeating units of a divalent aromatic group (residue formed by removing, from an aromatic compound, two hydrogen atoms bonded to the aromatic ring thereof), a sulfonyl group ($-SO_2-$), and an oxygen atom. The aromatic polysulfone can be produced, for example, using the raw materials described in JP 2013-159641 A.

That is, the aromatic dihalogenosulfone compound and the aromatic dihydroxy compound correspond to repeating units constituting an aromatic polysulfone. The aromatic dihalogenosulfone compound may be a compound including an aromatic ring, a sulfonyl group ($-SO_2-$), and two halogen atoms in each molecule. In addition, the aromatic dihydroxy compound may be a compound including an aromatic ring and two hydroxyl groups in each molecule.

Examples of the aromatic dihalogenosulfone compounds include bis(4-chlorophenyl)sulfone (dichlorodiphenylsulfone) and 4,4'-bis(4-chlorophenylsulfonyl)biphenyl.

Examples of the aromatic dihydroxy compounds include bis(4-hydroxyphenyl)sulfone, bis(4-hydroxy-3,5-dimethylphenyl)sulfone, bis(4-hydroxy-3-phenylphenyl)sulfone, 2,2-bis(4-hydroxyphenyl)propane, 2,2-bis(4-hydroxyphenyl)hexafluoropropane, bis(4-hydroxyphenyl)sulfide, bis(4-hydroxy-3-methylphenyl) sulfide, bis(4-hydroxyphenyl) ether, hydroquinone, resorcin, catechol, phenyl hydroquinone, 4,4'-dihydroxybiphenyl, 2,2'-dihydroxybiphenyl, 3,5,3',5'-tetramethyl-4,4'-dihydroxybiphenyl, 2,2'-diphenyl-4,4'-dihydroxybiphenyl, and 4,4'-dihydroxy-p-quarter-phenyl. In the present invention, a compound containing a halogeno group and a hydroxyl group in the molecule such as 4-hydroxy-4'(4-chlorophenylsulfonyl)biphenyl is preferably used instead of all or part of the aromatic dihalogenosulfone compound and the aromatic dihydroxy compound.

In the present invention, one type of either an aromatic dihalogenosulfone compound or an aromatic dihydroxy compound may be used alone, or two or more types may be used in combination in accordance with the type of the target aromatic polysulfone.

The base may be any base capable of activating the hydroxyl group of the aromatic dihydroxy compound. Of these, the base is preferably an alkali metal salt and more preferably an alkali metal salt of carbonic acid.

The alkali metal salt of carbonic acid may be alkaline carbonate, which is a normal salt, an alkaline bicarbonate (alkaline hydrogen carbonate), which is an acidic salt, or a mixture of a normal salt and an acidic salt. Sodium carbonate or potassium carbonate is preferable as an alkaline carbonate, and sodium bicarbonate or potassium bicarbonate is preferable as an alkaline bicarbonate.

In the present invention, one type of a base may be used alone, or two or more types thereof may be used in combination. Combinations of bases are not particularly limited and may be set appropriately in accordance with the objective.

In the polycondensation reaction, the molar ratio is adjusted so that the prescribed molecular weight can be controlled easily.

In the present invention, when performing a polycondensation reaction, one or more types of bases with a valence of n (where n is an integer of 1 or greater) may be compounded, and the number of moles of the base with respect to 1 mol of the aromatic dihydroxy compound may be adjusted so that the sum of the values of the moles of the base multiplied by n/2 times for each base type is preferably from 0.95 to 1.15 and more preferably from 1.00 to 1.10. Here, n is 2 in a case where the base is potassium carbonate and is 1 in a case where the base is potassium bicarbonate.

PAEK in the present invention is not particularly limited and has a structure including repeating units containing a divalent aromatic group (residue formed by removing, from an aromatic compound, two hydrogen atoms bonded to the aromatic ring thereof), a carbonyl bond, and an ether bond.

PAEK in the present invention can be produced using the raw materials described in JP S61-10486 A, JP H07-138360 A, WO 2003-050163, JP 2010-70657 A, and JP 2014-532109 T, for example.

That is, PAEK is produced by using aromatic dihalide compounds and aromatic dihydroxy compounds as known raw material monomers, and performing desalting polycondensation on these raw material monomers in the polymerization solvent together with an alkali metal carboxylic acid salt, an alkali metal hydrogen carbonate salt, or an alkali metal hydroxide, which is a basic alkali metal compound capable of forming a phenolate-type salt with the aromatic dihydroxy compound.

Examples of aromatic dihalide compounds include but are not limited to 4,4'-difluorobenzophenone and 4,4'-dichlorobenzophenone.

Examples of aromatic dihydroxy compounds include 1,3-dihydroxybenzene (resorcin), 1,4-dihydroxybenzene (hydroquinone), 4,4'-dihydroxybiphenyl (4,4'-biphenol), 4,4'-dihydroxyterphenyl, 2,6-dihydroxynaphthalene, 1,4-dihydroxynaphthalene, 4,4'-dihydroxydiphenylether, 4,4'-dihydroxyphenylsulfone, 4,4'-dihydroxybenzophenone, 4,4'-tetraphenyl bisphenol, but are not limited to these and various other diphenols such as bisphenol A, for example, can also be used.

The polymerization temperature of PAEK is preferably higher than 100° C. and not higher than 320° C., more preferably not lower than 150° C. and not higher than 300° C., and even more preferably not lower than 170° C. and not higher than 280° C. The polymerization temperature is the temperature under pressurized conditions.

In the polymerization step, polymerization is preferably performed in a reaction vessel with a gauge pressure of higher than 0 MPa and not higher than 1.0 MPa, preferably not higher than 0.7 MPa, and more preferably not higher than 0.5 MPa.

When recovering the PAEK reaction mixture, the mixture is preferably recovered in a slurry state by controlling the mass ratio of raw material monomers with respect to the polymerization solvent. The mass ratio of the raw material monomers/polymerization solvent is ordinarily from 1 to 25 parts by mass, preferably from 3 to 20 parts by mass, and even more preferably from 5 to 15 parts by mass of raw material monomers per 100 parts by mass of the polymerization solvent. By controlling the mass ratio of the raw material monomers with respect to the polymerization solvent to within the range described above, the known problem of the solidification of the reaction mixture during the recovery of the reaction mixture can be eliminated. In addition, the washing of the polymer and the recovery or recycling of the solvent or the like become easy.

PEN in an embodiment of the present invention is not particularly limited and has a structure including repeating units containing a divalent aromatic group to which a cyano group is bonded (residue formed by removing, from an aromatic compound to which a cyano group is bonded, two hydrogen atoms bonded to the aromatic ring thereof) and an ether bond.

PEN is obtained, for example, with the method described in JP H7-138360 A.

That is, PEN in an embodiment of the present invention is produced by using aromatic dihalide compounds and aromatic dihydroxy compounds as known raw material monomers. In the polymerization solvent, the raw material monomer s are subjected to desalting polycondensation together with an alkali metal carb oxylic acid salt, an alkali metal hydrogen carbonate salt, or an alkali metal hydroxide, which is a basic alkali metal compound capable of forming a phenolate-type salt with the aromatic dihydroxy compound to produce PEN.

Examples of aromatic dihalide compounds include but are not limited to 2,6-difluorobenzonitrile, 2,6-dichlorobenzonitrile, 2,4-difluorobenzonitrile, and 2,4-dichlorobenzonitrile.

An alkali metal compound of the desalting polycondensation in an embodiment of the present invention modifies the aromatic dihydroxy compound used in the reaction to the alkali metal salt. Examples of alkali metal compounds include carbonic acid salts, bicarbonates, or hydroxides of lithium, sodium, potassium, rubidium, or cesium. Of these, sodium or potassium compounds are ordinarily preferable as alkali metal compounds, or carbonic acid salts of alkali metals may also be preferable. That is, sodium carbonate and potassium carbonate are particularly preferable as alkali metal compounds. One type of these alkali metal compounds may be used alone, or two or more types thereof may be combined and used or used as a mixture as necessary. The appropriate amount of the alkali metal compound used is typically selected within the range from 1.01 to 2.5 equivalents per 1 equivalent of the aromatic dihydroxy compound that is used. Note that for both an aromatic dihydroxy compound and an alkali metal carbonic acid salt, 1 mol corresponds to 2 equivalents, whereas for both an alkali metal bicarbonate and hydroxide, 1 mol corresponds to 1 equivalent.

A solvent that is a liquid at room temperature is preferable as the polymerization solvent used for desalting polycondensation in the present invention. Examples of polymerization solvents include any solvents selected from the group consisting of N,N-dialkylformamides such as N,N-dimethylformamide (DMF), N,N-diethylformamide, and N,N-dipropylformamide, N,N-dialkylacetamides such as N,N-dimethylacetamide, N,N-diethylacetamide, and N,N-dipropylacetamide, N-alkyl-2-pyrrolidones or N-cycloalkylpyrrolidones such as N-methyl-2-pyrrolidone (NMP), N-ethyl-2-pyrrolidone, N-propyl-2-pyrrolidone, and N-cyclohexyl-2-pyrrolidone; N,N'-dialkylimidazolidinones such as N,N'-dimethylimidazolidinone, N,N'-diethylimidazolidinone, and N,N'-dipropylimidazolidinone; N-alkylcaprolactams such as N-methylcaprolactam, N-ethylcaprolactam, and N-propylcaprolactam; sulfones such as sulfolane(1,1-dioxothiolane), dimethylsulfone, diethylsulfone, diisopropylsulfone, and diphenylsulfone, and mixtures thereof. A polymerization solvent selected from the group consisting of sulfones and mixtures thereof is preferable, and a polymerization solvent selected from the group consisting of sulfolane, N-ethyl-2-pyrrolidone, N-methyl-2-pyrrolidone, and mixtures thereof is more preferably used.

Further, a polymerization solvent selected from the group consisting of N-alkyl-2-pyrrolidones, N-cycloalkylpyrrolidones, N-alkylcaprolactams, N,N'-dialkylimidazolidinones, N-alkylcaprolactams, sulfones, and mixtures thereof is preferably used, and in particular, among N-alkyl-2-pyrrolidones, N-methyl-2-pyrrolidone is preferably used.

When recovering a PAEK reaction mixture, the mixture is preferably recovered in a slurry state by controlling the weight ratio of raw material monomers with respect to the polymerization solvent.

The mass ratio of the raw material monomers/polymerization solvent is ordinarily from 1 to 25 parts by mass, preferably from 3 to 20 parts by mass, and even more preferably from 5 to 15 parts by mass of raw material monomers per 100 parts by mass of the polymerization solvent. The solvent may be supplied to the reaction mixture at some time between during the polymerization reaction and the recovery, and preferably between the end of the polymerization reaction and the recovery, to control the mass ratio of the raw material monomers/polymerization solvent to be within the range described above. Controlling the mass ratio of the raw material monomers with respect to the polymerization solvent to within the range described above can solve the known problem of the solidification of the reaction mixture during the recovery of the reaction mixture. In addition, the washing of the polymer and the recovery or recycling of the solvent or the like become easy.

The alkali metal salt used in the production of the aromatic polymer is preferably a solid powder having a fine particle diameter from the perspectives of supply properties and reactivity. Specifically, the average particle size of the alkali metal salt is preferably not greater than 95 μm, more preferably from 5 to 80 μm, even more preferably from 7 to 60 μm, and particularly preferably from 10 to 30 μm. In this specification, the average particle size refers to the mass average particle size and can be determined easily using an analyzer for particle analysis. In addition, such an average particle size can be obtained by using a typical pulverization method such as a homogenizer or an impact mill.

In addition, examples of aromatic polymers in which imide bonds are formed by a polycondensation reaction include thermoplastic polyimides including, for example, polyetherimides (PEI) such as Auram (trade name) available from Mitsui Chemical Co., Ltd. and Ultem (trade name) available from SABIC IP, and polyamideimides (PAI).

A polymerization reaction for obtaining the aromatic polymer having an imide bond is typically a dehydrative polycondensation reaction.

Note that although the continuous production method of the present embodiment differs from a known polymerization method in that the continuous production apparatus 100 is used, the actual mechanism of the polymerization reaction is the same as that of a known polymerization reaction. Therefore, the reaction raw materials and the solvent in the polymerization reaction, as well as polymerization aids or the like used as necessary, may be the same as those that are used in known reactions.

That is, these aromatic polyimides are produced by performing a dehydrative polycondensation reaction in a polymerization solvent using an aromatic diamine and aromatic polycarboxylic acid dianhydride as known raw material monomers.

As the aromatic diamine, the aromatic polycarboxylic acid dianhydride, and the solvent, the substances described in U.S. Pat. No. 5,043,419 may be used for forming a thermoplastic polyimide; the substances described in JP S57-20966 A may be used for forming PEI; and the substances described in JP S56-16171 B may be used for forming PAI.

Note that in a case where the reaction raw materials that are supplied to the housing chamber 2 are mostly in an anhydrous state, water may be added to at least some of the reaction vessels 1a to 1f to promote the reaction.

The weight average molecular weight (Mw) of the aromatic polymer obtained by the present embodiment is wide ranging. Ordinarily, the lower limit of the weight average molecular weight of the aromatic polymer obtained by the present embodiment according to gel permeation chromatography (GPC) is not less than 3000, preferably not less than 5000, and more preferably not less than 10000. In addition, the upper limit of the weight average molecular weight is not greater than 300000 and preferably not greater than 200000.

Embodiment 2

Another example of a continuous polymerization apparatus will be described with reference to FIG. 2.

Figure 2:
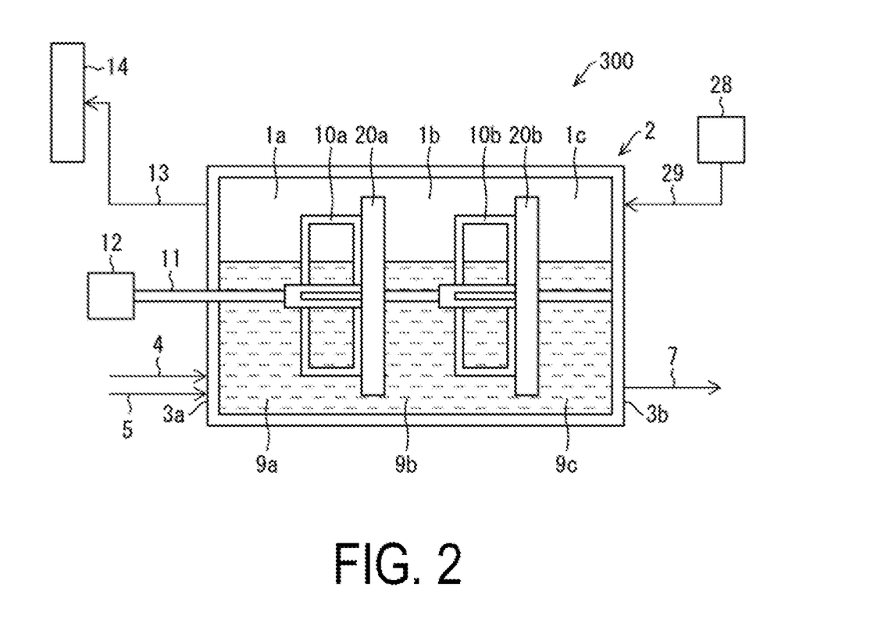
FIG. 2 is a partial cross-sectional view of the continuous production apparatus according to an embodiment of the present invention.

Referring to FIG. 2, a continuous polymerization apparatus 300 differs from Embodiment 1 in that inside the housing chamber 2, the isolating means for isolating the reaction vessels is not a partition wall, but rather a partition plate having a rotational center. Note that in FIG. 2, only the discharge line 13 is illustrated from among the lines connected to the water removing unit 14, but the other lines have the same configuration as in Embodiment 1.

In the present embodiment, the reaction vessel 1a and the reaction vessel 1b are separated by a partition plate 20a, and reaction vessel 1b and the reaction vessel 1c are separated by a partition plate 20b. The reaction vessels 1a, 1b, and 1c communicate with one another via a gas phase part in the housing chamber 2.

In addition, a stirring blade 10a configured to stir a reaction mixture 9a in the reaction vessel 1a is attached to one side of the partition plate 20a. Similarly, a stirring blade 10b configured to stir a reaction mixture 9b in the reaction vessel 1b is attached to one side of the partition plate 20b. Note that in contrast to the stirring blades 10a and 10b in the embodiment described above, the stirring blades 10a and 10b in the present embodiment have a structure in which an opening is provided on the inside.

The partition plates 20a and 20b of the stirring blades 10a and 10b are both installed on the same rotation shaft 21. The rotation shaft 21 is installed so as to pass through the side wall 3a from outside the housing chamber 2 and to reach the side wall 3b. A rotary driving device 12 configured to rotate the rotation shaft 21 is installed at the end of the rotation shaft 21 on the side wall 3a side.

Note that the stirring blades can be installed at any position with respect to the partition plates. The partition plates may be on the upstream side or the downstream side of the stirring blades, or there may be a combination thereof. The partition plates may be distanced from the stirring blades, but adhering and linking the partition plates as illustrated in FIG. 2 is preferable in that the partition plates can be fixed and reinforced. In addition, the stirring blades and partition plates do not necessarily need to be provided in pairs, and there may be areas in which there is no stirring blade between adjacent partition plates. Providing at least one stirring blade assists the progression of the polymerization reaction and ensures the smooth movement of solids in the reaction mixture. Alternatively, the stirring blades may not be provided, which makes it possible to achieve an even simpler apparatus configuration.

The shape of the partition plates is not particularly limited and may be any shape which has a rotational center and partially blocks a vertical cross-sectional surface in the housing chamber 2, but provides clearance or openings of a prescribed width simultaneously to allow the adjacent reaction vessels to communicate with one another. For example, in a case where the housing chamber 2 is a hollow cylindrical shape, as illustrated in FIG. 2, the partition plates may have a disc-like shape with a radius that is a size smaller than the internal space of the housing chamber. Note that the shape of the partition plates is not limited to such a shape and the partition place may not have a central axis. In a case where the partition plates do not have a central axis, a plurality of partition plates may form a basket-like rotating body by coupling the adjacent partition plates via a mesh-like member, for example. The basket-like rotating body is provided with a rotation shaft on the outer partition plate (partition plate positioned closest to the side wall 3b side), and rotating the rotation shaft can rotate each partition plate even without a rotation axis in the inside partition plate.

The number of partition plates provided on the rotation shaft may be any number greater than or equal to 1 in accordance with the size of the housing chamber, the type of the polymerization reaction, and the like.

In a case where two or more partition plates are provided, the shapes thereof may be the same or different.

In addition, the position of each partition plate is not particularly limited. And the partitions may provided at any positions.

On the other hand, the shape of the stirring blades is not particularly limited and may be any shape in which the reaction mixture can be stirred when provided coaxially with the partition plates. As illustrated in FIG. 2, the stirring blades 10 may be attached to either side of the partition plate 20 or may be attached to both sides. The stirring blades may also be attached to the rotation shaft 21 separately from the partition plates.

The liquid phase parts of the reaction vessels 1a to 1c communicate with one another. As a result, the raw materials and solvent supplied to the reaction vessel 1a successively move to the reaction vessels 1b and 1c while proceeding the polymerization reaction as a reaction mixture.

In addition, the gas phase parts of the reaction vessels 1a to 1c communicate with one another. As a result, the pressure of the gas phase in the housing chamber 2 is uniform. The evaporation components generated at the time of polymerization in each of the reaction vessels successively move from the reaction vessels 1c to 1b and 1a via the gas phase part due to the temperature difference or the like in the apparatus, and discharged from the discharge line 13.

In the continuous polymerization apparatus 300 in the present embodiment, a clearance of a prescribed width exists between the inner wall of the housing chamber 2 and each of the outer edges of the partition plates 20a to 20b. Thus, the gas phase parts and the liquid phase parts of adjacent reaction vessels respectively communicate with one another, and the reaction mixture, gas containing evaporation components, and the like move across the reaction vessels. Opening parts such as through-holes or slits, for example, may be provided in the partition plates instead of providing a clearance to allow the reaction vessels to communicate through the openings. Alternatively, both a clearance and opening parts may be provided. Alternatively, the partition plates may have a mesh shape with a plurality of fine through-holes.

The width of the clearance or the size of the opening part is not particularly limited and may be selected appropriately in accordance with the shape of the vessel or the shape and number of the partition plates. The proportion of the cross-sectional area of the clearance or the opening part relative to the vertical cross-section of the internal space of the reactor is from 1 to 50%, preferably from 3 to 30%, and more preferably from 5 to 20%. In a case where the proportion of the cross-sectional area of the clearance or the opening part is within the range described above, the countercurrent of reaction mixtures containing solids and volatile components can be prevented, and the movement can be controlled.

Embodiment 3

Next, another example of the continuous production apparatus illustrated in Embodiment 1 described above will be described with reference to FIG. 3.

Figure 3:
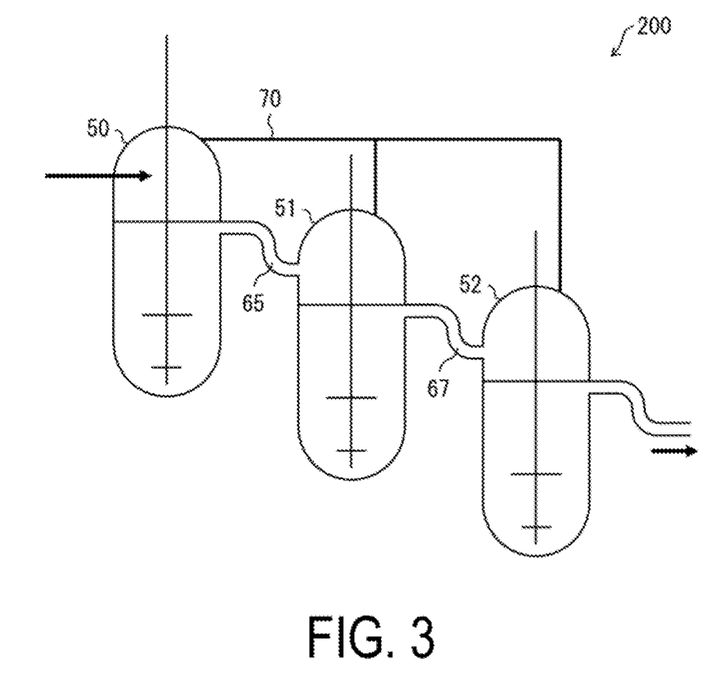
FIG. 3 is a partial cross-sectional view of the continuous production apparatus according to an embodiment of the present invention.

Referring to FIG. 3, a continuous production apparatus 200 includes a first reaction vessel 50, a second reaction vessel 51, and a third reaction vessel 52. The second reaction vessel 51 is disposed below the first reaction vessel 50 in the vertical direction, and the third reaction vessel 52 is disposed below the second reaction vessel 51 in the vertical direction.

The first and second reaction vessels 50 and 51 are connected by a first pipe 65. In addition, the second and third reaction vessels 51 and 52 are connected by a second pipe 67.

The first pipe 65 is provided so that when the reaction mixture (not illustrated) in the first reaction vessel 50 exceeds the maximum liquid surface level, the reaction mixture moves through the first pipe 65 to the second reaction vessel 51. In addition, the second pipe 67 is provided so that when the reaction mixture (not illustrated) in the second reaction vessel 51 exceeds the maximum liquid surface level, the reaction mixture moves through the second pipe 67 to the third reaction vessel 52.

Further, a ventilation part 70 is connected to each of the first through third reaction vessels 50 to 52. The first through third reaction vessels 50 to 52 communicate through the ventilation part 70 via a gas phase. As a result, the pressure in the gas phase parts of the first through third reaction vessels 50 to 52 can be made uniform.

With the configuration of such a continuous production apparatus 200, the same effect as in Embodiment 1 can be achieved by successively moving the reaction mixture using the difference in maximum liquid surface level of each of the first and second reaction vessels 50 and 51. Further, with the continuous production apparatus 200, it is unnecessary to provide partition walls as illustrated in Embodiment 1.

The continuous production apparatus of Embodiment 1 or 2 is preferable as the continuous production apparatus of the present embodiment from the perspective of simplicity.

SUMMARY

The continuous production method for an aromatic polymer according to an embodiment of the present invention is a continuous production method for an aromatic polymer having an ether bond or an imide bond, the method including:

(a) supplying a polymerization solvent and a reaction raw material to a continuous production apparatus including a plurality of reaction vessels;

(b) performing a polycondensation reaction in the polymerization solvent in at least one of the reaction vessels to form a reaction mixture; and (c) successively moving the reaction mixture to each of the reaction vessels;

the steps (a), (b), and (c) being performed in parallel;

wherein an ether bond or an imide bond is formed by the polycondensation reaction;

respective gas phase parts of the plurality of reaction vessels communicate with one another; and a pressure of each of the gas phase parts is uniform.

In one embodiment of the continuous production method, the polycondensation reaction is preferably a desalting polycondensation reaction in which the ether bond is formed.

In one embodiment of this continuous production method, the reaction vessels are preferably configured so that at least one pair among combinations of adjacent reaction vessels is sequentially connected in the order of the highest maximum liquid surface level of a liquid that can be housed by the reaction vessels, and the reaction mixture is preferably moved from a reaction vessel with a higher maximum liquid surface level to a reaction vessel with a lower maximum liquid surface level due to a difference in the maximum liquid surface level.

In one embodiment of this continuous production method, the reaction vessels are preferably sequentially connected in the order of the highest maximum liquid surface level of a liquid that can be housed by each reaction vessel, and the reaction mixture is preferably successively moved in accordance with the order from a reaction vessel with a higher maximum liquid surface level to a reaction vessel with a lower maximum liquid surface level due to a difference in the maximum liquid surface level.

In one embodiment of the continuous production method, the respective reaction vessels are preferably connected in series.

In one embodiment of the continuous production method, the method preferably further includes (d) removing at least a part of water in the gas phase part of the reaction vessels from the reaction vessels, and the steps (a), (b), (c), and (d) are preferably performed in parallel.

In one embodiment of the continuous production method, the method preferably further includes (e) feeding an inert gas to the gas phase part from a downstream side toward an upstream side in a movement direction of the reaction mixture, and the steps (a), (b), (c), (d), and (e) are preferably performed in parallel.

In one embodiment of this continuous production method, the method preferably further includes:

(f) separating and recovering some of the reaction raw material from the gas phase part; and (g) resupplying at least some of the separated and recovered reaction raw material to at least some of the reaction vessels, and the steps (a), (b), (c), (d), (e), (f), and (g) are preferably performed in parallel.

In one embodiment of the continuous production method, the continuous production apparatus preferably includes a housing chamber, and the plurality of reaction vessels are preferably provided by dividing the space inside the housing chamber.

In one embodiment of the continuous production method, the reaction raw material preferably includes an alkali metal salt in a solid powder state, and the alkali metal salt is preferably formed by refining an alkali metal salt with an average particle size of not less than 100 μm to an average particle size of not greater than 95 μm.

In addition, the continuous production apparatus for an aromatic polymer according to an embodiment of the present invention is a continuous production apparatus for an aromatic polymer in which an ether bond or an imide bond is formed by a polycondensation reaction, the apparatus including a plurality of reaction vessels; wherein a reaction mixture is formed by performing a polycondensation reaction in a polymerization solvent in at least one of the reaction vessels; gas phase parts of the reaction vessels communicate with one another; and the reaction vessels are sequentially connected so that the reaction mixture successively moves to each of the reaction vessels.

In one embodiment of the continuous production apparatus, the reaction vessels are preferably configured so that at least one pair among combinations of adjacent reaction vessels is sequentially connected in the order of the highest maximum liquid surface level of a liquid that can be housed by the reaction vessels, and the reaction mixture is preferably moved from a reaction vessel with a higher maximum liquid surface level to a reaction vessel with a lower maximum liquid surface level due to a difference in the maximum liquid surface level.

In one embodiment of the continuous production apparatus, the reaction vessels are preferably sequentially connected in the order of the highest maximum liquid surface level of a liquid that can be housed by each reaction vessel, and the reaction mixture is preferably successively moved in accordance with the order from a reaction vessel with a higher maximum liquid surface level to a reaction vessel with a lower maximum liquid surface level due to a difference in the maximum liquid surface level.

In one embodiment of the continuous production apparatus, the respective reaction vessels are preferably connected in series.

In one embodiment of the continuous production apparatus, the continuous production apparatus preferably further includes a housing chamber, and the plurality of reaction vessels are preferably provided by dividing the space inside the housing chamber.

In one embodiment of the continuous production apparatus, the reaction vessels that are adjacent to one another are preferably separated by a partition wall, and in each of the reaction vessels except the reaction vessel furthest upstream in the movement direction of the reaction mixture, a minimum height of a partition wall on an upstream side in the movement direction is preferably greater than the maximum liquid surface level of each of the reaction vessels.

Another embodiment of this continuous production apparatus is an aspect further including a housing chamber, wherein each of the plurality of reaction vessels is isolated by one or more partition plates having a rotational center provided inside the housing chamber.

Note that in the continuous production apparatus according to another embodiment described above, the rotational center is more preferably a rotation shaft; the rotational center is more preferably one rotation shaft passing through a plurality of reaction vessels, and the one or more partition plates are more preferably provided on the one rotation shaft; or a stirring blade having the same rotational center as the partition plates are more preferably further provided.

In one embodiment of the continuous production apparatus, the apparatus preferably further includes a stirring blade configured to stir the reaction mixture in the reaction vessels.

In one embodiment of the continuous production apparatus, the stirring blade is preferably installed on the same stirring shaft.

In one embodiment of the continuous production apparatus, the apparatus further includes a water removing unit which communicates with a gas phase in the housing chamber and removes water from the gas phase.

In one embodiment of the continuous production method, the apparatus further includes a gas feeding unit which communicates with a gas phase in the housing chamber and feeds an inert gas to the gas phase from a downstream side toward an upstream side in a movement direction of the reaction mixture.

In one embodiment of the continuous production apparatus, the apparatus preferably further includes a heating means for separately controlling temperatures of the reaction vessels.

In one embodiment of this continuous production method, the apparatus preferably further includes a reaction raw material separation and recovery unit configured to separate and recover some of the reaction raw material from the gas phase part; and a reaction raw material resupply unit configured to resupply at least some of the separated and recovered reaction raw material to at least some of the reaction vessels.

Embodiments of the present invention will be described in further detail hereinafter using examples. Of course, the present invention is not limited to the following examples, and it goes without saying that various modes are possible for the details. Further, the present invention is not limited to the embodiments described above, and various modifications are possible within the scope indicated in the claims. Embodiments obtained by appropriately combining the technical means disclosed by the embodiments are also included in the technical scope of the present invention. In addition, all documents cited in this specification are incorporated by reference.

EXAMPLES

Measurement Method for Weight Average Molecular Weight

The weight average molecular weight (Mw) of the polymer was measured using a gel permeation chromatograph (GPC) EXTREMA, available from the JASCO Corporation, under the following conditions. The weight average molecular weight was calculated in terms of polystyrene.

Solvent: NMP solution containing 0.01 M LiBr
Temperature: 40° C.
Detector: RI detector
Sample injection amount: 100 μL (concentration: 1 mg/mL)
Flow rate: 1.0 mL/min
Standard polystyrene: Five types of standard polystyrene—427000, 96400, 37900, 17400, and 5560.

Example 1: PPSU Production

A polymerization reaction was performed using a continuous polymer production apparatus including 6 reaction vessels formed by partitioning the housing chamber with 5 partition walls, as illustrated in FIG. 1. This continuous production apparatus was a titanium reaction apparatus having dimensions of 108 mm (diameter)×300 mm (length), and including semicircular partition walls.

950 g of N-methyl-2-pyrrolidone (NMP) was charged into the continuous production apparatus. Then, nitrogen gas was fed at a flow rate of 0.1 NL/min from the downstream side of the fifth partition wall counted from the upstream side, and a temperature 1 of a portion partitioned by first and second partition walls counted from the upstream side, that is, the second reaction vessel counted from the upstream side, was maintained at 200° C., and a temperature 2 of the fourth reaction vessel counted from the upstream side was maintained at 210° C. by an external heater installed at the base of the housing chamber 2. In a steady state, a temperature 3 of the first reaction vessel counted from the upstream side was 180° C., and a temperature 4 of the fifth reaction vessel counted from the upstream side was 210° C. Raw materials were continuously supplied for eight hours from a supply line at a flow rate of 6.4 g/min for NMP, 4, 4'-dihydroxybiphenyl (DHBP), dichlorodiphenylsulfone (DCPS), and potassium carbonate (NMP:DCPS (weight ratio)=760:201.01, DHBP:DCPS (molar ratio)=1:1, DHBP:potassium carbonate (molar ratio)=1:1.1) using a constant-flow pump while stirring with a stirrer.

Note that potassium carbonate with an average particle size of 100 μm or greater in the mixture was insoluble and prone to aggregate, which yielded poor supply properties. Therefore, potassium carbonate was pulverized (average particle size: 95 μm or less) into a slurry at approximately 10000 rpm/min using a homogenizer before being supplied.

Simultaneously, water produced by the reaction was continuously removed from the continuous production apparatus using a distillation device connected to the continuous production apparatus 100 while controlling the pressure to a gauge pressure of 0.1 MPa with a pressure adjustment valve. In addition, carbon dioxide gas produced by the reaction was discharged to the atmosphere via the distillation device and a water storage tank.

The inside of the reaction apparatus was observed after the completion of the operation, and the presence of a reaction solution was confirmed at a level in which the solution flowed over the dams into all of the reaction vessels.

The reaction mixture was collected from the reaction mixture recovery line and analyzed. The reaction mixture was added dropwise into five times the amount of water to the reaction mixture, and the product was precipitated and filtered. The product was further washed with methanol and filtered, and the resulting cake was dried for eight hours at 60° C. in a vacuum, and thereby a polyphenylsulfone (PPSU) powder was obtained. The weight average molecular weight Mw of the PPSU powder according to GPC in terms of polystyrene was 77500.

Example 2: PPSU Production

The continuous polymer production apparatus same as that illustrated in FIG. 1 was used with the exception that the apparatus included 11 reaction vessels formed by partitioning the reaction container body with 10 disc-shaped partition plates. In this continuous polymer production apparatus, the reaction container body was a titanium reaction device having dimensions of 108 mm (inner diameter)×300 mm (length). All ten partition plates had the same shape and were provided on a rotation shaft with a 5 mm diameter. For each partition plate, as illustrated in FIG. 3, two anchor-type stirring blades were provided in a cross shape on the surface of the plate on the upstream side in the movement direction of the reaction mixture. The diameter of each partition plate was 100 mm, the length a of the anchor-type stirring blades in the long axis direction was 90 mm, and the length b in the short axis direction was 40 mm. At the position where each partition plate was provided, the proportion of the cross-sectional area of the clearance relative to the vertical cross-section of internal space of the reactor was approximately 14%.

1700 g of N-methyl-2-pyrrolidone (NMP) was charged into the continuous polymer production apparatus as an organic amide solvent. Then, nitrogen gas was fed from the downstream side of the eleventh reaction vessel counted from the downstream side in the movement direction of the reaction mixture, and a temperature 1 of the second reaction vessel counted from the upstream side was maintained at 200° C., and a temperature 2 of the fifth reaction vessel was maintained at 210° C. with an external heater installed at the base of the housing chamber. Here, in the standard condition, the flow rate of the nitrogen gas was 0.1 NL/min, and the nitrogen gas linear velocity passing through the clearance of the partition plate was 0.8 cm/s.

Raw materials were continuously supplied from the supply line for eight hours at a flow rate of 13.0 g/min for a mixture of NMP, 4,4'-dihydroxybiphenyl (DHBP), dichlorodiphenylsulfone (DCPS), and potassium carbonate (NMP:DCPS (weight ratio)=760:201.01, DHBP:DCPS (molar ratio)=1:1, DHBP:potassium carbonate (molar ratio)=1:1.1) using a constant-flow pump while stirring with a stirrer. Note that potassium carbonate with an average particle size of 95 μm or greater in the mixture was pulverized (average particle size: 95 μm or less) into a slurry at approximately 10000 rpm/min using a homogenizer before being supplied.

Simultaneously, water was continuously removed from the continuous polymer production apparatus using a distillation device connected to the continuous polymer production apparatus while controlling the pressure to a gauge pressure of 0.1 MPa with a pressure adjustment valve. In addition, carbon dioxide gas produced by the reaction was discharged to the atmosphere via the distillation device and a water storage tank.

The above operation was continued for eight hours, and then the resulting reaction mixture was collected and analyzed. The reaction mixture was added dropwise into five times the amount of water to the reaction mixture, and the product was precipitated and filtered. The product was further washed with methanol and filtered, and the resulting cake was dried for eight hours at 60° C. in a vacuum, and thus a polyphenylsulfone (PPSU) powder was obtained. The weight average molecular weight Mw of the PPSU powder according to GPC in terms of polystyrene was 130000.

Example 3: PSU Production

A polymerization reaction was performed using a continuous polymer production apparatus including 6 reaction vessels formed by partitioning the housing chamber with 5 partition walls, as illustrated in FIG. 1. This continuous production apparatus was a titanium reaction apparatus having dimensions of 108 mm (diameter)×300 mm (length), and including semicircular partition walls.

950 g of N-methyl-2-pyrrolidone (NMP) was charged into this continuous production apparatus. Then, nitrogen gas was fed at a flow rate of 0.1 NL/min from the downstream side of the fifth partition wall counted from the upstream side, and a temperature 1 of a portion partitioned by first and second partition walls counted from the upstream side, that is, the second reaction vessel counted from the upstream side, was maintained at 220° C., and a temperature 2 of the fourth reaction vessel counted from the upstream side was maintained at 230° C. by an external heater installed at the base of the housing chamber 2, a temperature 3 of the first reaction vessel counted from the upstream side was 200° C., and a temperature 4 of the fifth reaction vessel counted from the upstream side was 230° C.

Raw materials were continuously supplied for eight hours from a supply line at a flow rate of 6.4 g/min for NMP, 2,2-bis(4-hydroxyphenyl)propane (BHPP), dichlorodiphenylsulfone (DCPS), and potassium carbonate (NMP:DCPS (weight ratio)=760:201.01, BHPP:DCPS (molar ratio)=1:1, BHPP:potassium carbonate (molar ratio)=1:1.1) using a constant-flow pump while stirring with a stirrer.

Note that potassium carbonate with an average particle size of 95 μm or greater in the mixture was pulverized (average particle size: 95 μm or less) into a slurry at approximately 10000 rpm/min using a homogenizer before being supplied.

Simultaneously, water produced by the reaction was continuously removed from the continuous production apparatus using a distillation device connected to the continuous production apparatus 100 while controlling the pressure to a gauge pressure of 0.2 MPa with a pressure adjustment valve. In addition, carbon dioxide gas produced by the reaction was discharged to the atmosphere via the distillation device and a water storage tank.

The reaction mixture was collected from the reaction mixture recovery line and analyzed. The reaction mixture was added dropwise into five times the amount of water to the reaction mixture, and the product was precipitated and filtered. The product was further washed with methanol and filtered, and the resulting cake was dried for eight hours at 60° C. in a vacuum, and thus a polysulfone (PSU) powder was obtained. The weight average molecular weight Mw of the PSU powder according to GPC in terms of polystyrene was 100000.

Example 4: PES Production

A polymerization reaction was performed using a continuous polymer production apparatus including 6 reaction vessels formed by partitioning the housing chamber with 5 partition walls, as illustrated in FIG. 1. This continuous production apparatus was a titanium reaction apparatus having dimensions of 108 mm (diameter)×300 mm (length), and including semicircular partition walls.

950 g of N-methyl-2-pyrrolidone (NMP) was charged into this continuous production apparatus. Then, nitrogen gas was fed at a flow rate of 0.1 NL/min from the downstream side of the fifth partition wall counted from the upstream side, and a temperature 1 of a portion partitioned by first and second partition walls counted from the upstream side, that is, the second reaction vessel counted from the upstream side, was maintained at 200° C., and a temperature 2 of the fourth reaction vessel counted from the upstream side was maintained at 210° C. by an external heater installed at the base of the housing chamber 2. In a steady state, a temperature 3 of the first reaction vessel counted from the upstream side was 180° C., and a temperature 4 of the fifth reaction vessel counted from the upstream side was 215° C.

Raw materials were continuously supplied for eight hours from each supply line at a flow rate of 3.6 g/min for NMP, 4,4'-dihydroxydiphenylsulfone (DHDPS), and dichlorodiphenylsulfone (DCPS) (NMP:DCPS (weight ratio)=760:201.01, DHDPS:DCPS (molar ratio)=1:1) and 2.8 g/min for NMP and potassium carbonate (NMP:potassium carbonate (weight ratio)=760:106.41) using a constant-flow pump while stirring with a stirrer (DHDPS:potassium carbonate (molar ratio)=1:1.1).

Note that potassium carbonate with an average particle size of 95 μm or greater in the mixture was pulverized (average particle size: 95 μm or less) into a slurry at approximately 10000 rpm/min using a homogenizer before being supplied.

Simultaneously, water produced by the reaction was continuously removed from the continuous production apparatus using a distillation device connected to the continuous production apparatus 100 while controlling the pressure to a gauge pressure of 0.1 MPa with a pressure adjustment valve. In addition, carbon dioxide gas produced by the reaction was discharged to the atmosphere via the distillation device and a water storage tank.

The inside of the reaction apparatus was observed after the completion of the operation, and the presence of a reaction solution was confirmed at a level in which the solution flowed over the dams into all of the reaction vessels.

The reaction mixture was collected from the reaction mixture recovery line and analyzed. The reaction mixture was added dropwise into five times the amount of water to the reaction mixture, and the product was precipitated and filtered. The product was further washed with methanol and filtered, and the resulting cake was dried for eight hours at 60° C. in a vacuum, and thereby a polyether sulfone (PES)

powder was obtained. The weight average molecular weight Mw of the PES powder according to GPC in terms of polystyrene was 9000.

Example 5: PEEK Production

A polymerization reaction was performed using a continuous polymer production apparatus including 6 reaction vessels formed by partitioning the housing chamber with 5 partition walls, as illustrated in FIG. 1. This continuous production apparatus was a titanium reaction apparatus having dimensions of 108 mm (diameter)×300 mm (length), and including semicircular partition walls.

950 g of N-methyl-2-pyrrolidone (NMP) was charged into this continuous production apparatus. Then, nitrogen gas was fed at a flow rate of 0.1 NL/min from the downstream side of the fifth partition wall counted from the upstream side, and a temperature 1 of a portion partitioned by first and second partition walls counted from the upstream side, that is, the second reaction vessel from the upstream side, was maintained at 220° C., a temperature 2 of the fifth reaction vessel from the upstream side was maintained at 260° C., and a temperature 3 of the sixth reaction vessel from the upstream side was maintained at 260° C. by an external heater installed at the base of the housing chamber 2. In a steady state, a temperature 4 of the first reaction vessel from the upstream side was 190° C., and a temperature 5 of the fourth reaction vessel from the upstream side was 250° C. Raw materials were continuously supplied for eight hours from a supply line at a flow rate of 6.4 g/min for NMP, 4,4'-difluorobenzophenone (DFBP), hydroquinone (HQ), and potassium carbonate (NMP:DFBP (weight ratio)=1202.57:160.00, DFBP:HQ (molar ratio)=1:1, HQ:potassium carbonate (molar ratio)=1:1.1) using a constant-flow pump while stirring with a stirrer.

Note that potassium carbonate with an average particle size of 95 μm or greater in the mixture was pulverized (average particle size: 95 μm or less) into a slurry at approximately 10000 rpm/min using a homogenizer before being supplied.

Simultaneously, water produced by the reaction was continuously removed from the continuous production apparatus using a distillation device connected to the continuous production apparatus 100 while controlling the pressure to a gauge pressure of 0.3 MPa with a pressure adjustment valve. In addition, carbon dioxide gas produced by the reaction was discharged to the atmosphere via the distillation device and a water storage tank.

In addition, NMP at 260° C. was supplied at a flow rate of 2.9 g/min from the lower part of the sixth reaction vessel, and the reaction mixture was diluted ((DFBP+HQ)/NMP (100 parts by mass)=10 parts by mass) to recover the reaction mixture in a slurry state.

The inside of the reaction apparatus was observed after the completion of the operation, and the presence of a reaction solution was confirmed at a level in which the solution flowed over the dams into all of the reaction vessels.

The reaction mixture was collected from the reaction mixture recovery line and analyzed. The reaction mixture was added dropwise into five times the amount of water to the reaction mixture, and the product was precipitated and filtered. The product was further washed with methanol and filtered, and the resulting cake was dried for eight hours at 60° C. in a vacuum, and thereby a polyether ether ketone (PEEK) powder was obtained. The reduced viscosity of this PEEK powder was 0.3 (dL/g).

Note that the reduced viscosity was determined with the following method.
Solution Adjustment Method First, 0.1 g of PEEK and 10 mL of 4-chlorophenol were dissolved in an oil bath for 20 minutes at 180° C. while heating and stirring. The solution was cooled to room temperature, and then 3 mL of the solution was diluted with 7 mL of o-dichlorobenzene.
Reduced Viscosity Measurement Method The reduced viscosity is measured with an Ubbellohde viscometer at 35° C.
Calculation of Reduced Viscosity The viscosity ($\eta 0$) of the solvent was measured using an Ubbellohde viscometer tube. The specific viscosity ratio (($\eta - \eta 0$)/$\eta 0$) was determined from the viscosity ($\eta$) of the prepared solution and the viscosity ($\eta 0$) of the solvent, and this specific viscosity ratio was divided by the concentration of the solution (0.3 g/dL) to determine the reduced viscosity (dL/g).

Example 6: PEEK Production

The continuous polymer production apparatus same as that used in Example 2 was used with the exception that the apparatus included 10 reaction vessels formed by partitioning the housing chamber with 9 disc-shaped partition plates. 1500 g of N-methyl-2-pyrrolidone (NMP) was charged into the continuous polymer production apparatus. Then, nitrogen gas was fed from the downstream side of the tenth reaction vessel counted from the upstream side in the movement direction of the reaction mixture, and a temperature 1 of the third reaction vessel counted from the upstream side was maintained at 210° C., a temperature 2 of the fifth reaction vessel was maintained at 240° C., a temperature 3 of the ninth reaction vessel was maintained at 260° C., and a temperature 4 of the tenth reaction vessel was maintained at 260° C. with an external heater installed at the base of the housing chamber. Here, in the standard condition, the flow rate of the nitrogen gas was 1 NL/min and the nitrogen gas linear velocity passing through the clearance of the partition plate was 8 cm/s.

Raw materials were continuously supplied from a supply line for six hours at a flow rate of 13.8 g/min for NMP, 4,4'-difluorobenzophenone (DFBP), hydroquinone (HQ), and potassium carbonate (NMP:DFBP (weight ratio)=2804.43:654.53, DFBP:HQ (molar ratio)=1.01:1, HQ:potassium carbonate (molar ratio)=1:1.1) using a constant-flow pump while stirring with a stirrer.

Note that the pulverization of the potassium carbonate and the adjustment of pressure were performed with the same methods as in Example 1.

After the above operation was continued for five hours, the resulting reaction mixture was added dropwise into five times the amount of water to the reaction mixture, and the solid content was filtered. The product was further washed with methanol and filtered, and the resulting cake was dried for eight hours at 60° C. in a vacuum, and thereby a polyether ether ketone (PEEK) powder was obtained.

The by-product salt that was separated and recovered had a recovery rate (recovered amount/theoretically produced amount) of approximately 50%. In addition, the reduced viscosity of the PEEK powder was 0.6 (dL/g), and the reduced viscosity was determined with the method described above.

REFERENCE SIGNS LIST 1a to 1f Reaction vessel
2 Housing chamber 3a, 3b Side wall
4 Reaction solvent supply line
5 Reaction raw material supply line
7 Reaction mixture recovery line
8a to 8e Partition wall
9a to 9f Reaction mixture
10a to 10f Stirring blade
11 Stirring shaft
12 Rotary driving device
13 Discharge line
14 Water removing unit
15 Reaction solvent recovery line
16 Vapor recovery line
17 Gas-liquid separation unit
18 Gas recovery line
19, 24 Reaction raw material separation and recovery unit
20 Waste gas line
20a, 20b Partition plate
21, 26 Reaction raw material resupply line
22, 27 Reaction raw material resupply unit
23 Liquid recovery line
25 Wastewater line
28 Gas feeding unit
29 Gas feeding line
100, 200, 300 Continuous production apparatus
50 First reaction vessel
51 Second reaction vessel
52 Third reaction vessel
65 First pipe
67 Second pipe
70 Ventilation unit

The invention claimed is:

1. A continuous production method for an aromatic polymer having an ether bond or an imide bond, the method comprising:
   (a) supplying a polymerization solvent and a reaction raw material to a continuous production apparatus including a plurality of reaction vessels in a housing chamber and a stirring shaft coupled to opposite side walls of the housing chamber;
   (b) performing a polycondensation reaction in the polymerization solvent in at least one of the reaction vessels to form a reaction mixture; and
   (c) stirring the reaction mixture in at least one of the reaction vessels by rotating a stirring blade around the stirring shaft, wherein the stirring blade is installed on the stirring shaft and positioned in the at last one of the reaction vessels; and
   (d) successively moving the reaction mixture to each of the reaction vessels, wherein a temperature in a downstream reaction vessel is the same as or higher than a temperature of an adjacent upstream reaction vessel,
   the steps (a), (b), (c), and (d) being performed in parallel,
   wherein an ether bond or an imide bond is formed by the polycondensation reaction;
   respective gas phase parts of the plurality of reaction vessels communicate with one another;
   a pressure of each of the gas phase parts is uniform;
   the polycondensation reaction is a desalting polycondensation reaction;
   the reaction vessels are configured such that at least one pair among combinations of adjacent reaction vessels is sequentially connected in the order of the highest maximum liquid surface level of a liquid that can be housed by the reaction vessels;
   the reaction mixture is moved from a reaction vessel with a higher maximum liquid surface level to a reaction vessel with a lower maximum liquid surface level due to a difference in the maximum liquid surface level; and
   at least one reaction vessel has a higher temperature than the adjacent upstream reaction vessel.

2. The continuous production method for an aromatic polymer according to claim 1, wherein the polycondensation reaction is a desalting polycondensation reaction in which the ether bond is formed.

3. The continuous production method for an aromatic polymer according to claim 1, wherein
   the reaction vessels are sequentially connected in the order of the highest maximum liquid surface level of a liquid that can be housed by each of the reaction vessels; and
   the reaction mixture is successively moved in accordance with the order from a reaction vessel with a higher maximum liquid surface level to a reaction vessel with a lower maximum liquid surface level due to a difference in the maximum liquid surface level.

4. The continuous production method for an aromatic polymer according to claim 1, wherein the respective reaction vessels are connected in series.

5. The continuous production method for an aromatic polymer according to claim 1, further comprising (d) removing at least a part of water in the gas phase part of the reaction vessels from the reaction vessels,
   the steps (a), (b), (c), and (d) being performed in parallel.

6. The continuous production method for an aromatic polymer according to claim 1, further comprising (e) feeding an inert gas to the gas phase part from a downstream side toward an upstream side in a movement direction of the reaction mixture,
   the steps (a), (b), (c), (d) and (e) being performed in parallel.

7. The continuous production method for an aromatic polymer according to claim 1, further comprising:
   (f) separating and recovering some of the reaction raw material from the gas phase part; and
   (g) resupplying at least some of the separated and recovered reaction raw material to at least some of the reaction vessels,
   the steps (a), (b), (c), (d), (e), (f), and (g) being performed in parallel.

8. The continuous production method for an aromatic polymer according to claim 1, wherein the continuous production apparatus includes a housing chamber, and the plurality of reaction vessels are provided by dividing the space inside the housing chamber.

9. The continuous production method for an aromatic polymer according to claim 1, wherein the reaction raw material includes an alkali metal salt in a solid powder state, and the alkali metal salt is formed by refining an alkali metal salt with an average particle size of not less than 100 μm to an average particle size of not greater than 95 μm.

10. The continuous production method for an aromatic polymer according to claim 1, wherein the downstream reaction vessel has a higher temperature than the adjacent upstream reaction vessel.

* * * * *